United States Patent [19] [11] 4,036,813
Hardman et al. [45] July 19, 1977

[54] COMPOSITION FOR PROMOTING ADHESION OF CURABLE SILICONES TO SUBSTRATES

[75] Inventors: Bruce Bertolette Hardman, Mechanicville; William Thomas Madigan, Valley Falls, both of N.Y.

[73] Assignee: General Electric Company, Waterford, N.Y.

[21] Appl. No.: 635,618

[22] Filed: Nov. 26, 1975

[51] Int. Cl.² .................................. C08G 77/04
[52] U.S. Cl. ........................ 260/46.5 G; 260/18 S
[58] Field of Search ................. 260/46.5 G, 18 S

[56] References Cited

U.S. PATENT DOCUMENTS

| | | | |
|---|---|---|---|
| 3,673,233 | 6/1972 | Golitz et al. | 260/46.5 G |
| 3,689,454 | 9/1972 | Smith et al. | 260/46.5 G |
| 3,839,246 | 10/1974 | Hamilton, Jr. et al. | 260/46.5 G |

Primary Examiner—Melvyn I. Marquis
Attorney, Agent, or Firm—John L. Young; E. Philip Koltos; Edward A. Hedman

[57] ABSTRACT

The adhesion of self-bonding curable silicones to substrates is enhanced by including in the silicone composition, before curing, a small amount of an adhesion promoting composition comprising predominantly one or more compounds of the formulae:

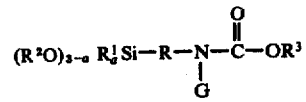

wherein G is H or

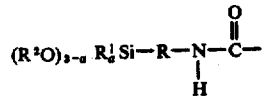

wherein R is alkylene-arylene, alkylene or cycloalkylene, $R^1$ and $R^3$ are hydrocarbyl or halohydrocarbyl, $R^2$ is the same as $R^1$ and $R^3$ and, in addition, cyanohydrocarbyl, and $a$ is 0 to 3.

12 Claims, No Drawings

COMPOSITION FOR PROMOTING ADHESION OF CURABLE SILICONES TO SUBSTRATES

This invention relates to compositions for enhancing the bonding of silicones to substrates. More particularly, it is concerned with self-bonding compositions of curable siloxanes, which contain an adhesion promoting amount of a composition comprising predominantly a triorganosilylorgano carbamate or allophanate derivative thereof.

BACKGROUND OF THE INVENTION

Self-bonding curable silicone compositions are known to have a variety of uses, for example, as sealants, as caulking compositions, in the formation in situ of gaskets, and as potting compounds. In general, the most broadly applicable such compositions are the RTV's, (room temperature vulcanizables), particularly those which cure under the influence of atmospheric moisture. Self-bonding compositions of the RTV type are described, for example, in Smith and Hamilton, U.S. Pat. No. 3,689,454. A particularly advantageous low-modulus self-bonding composition is described in the copending application of Beers, Ser. No. 579,025, filed May 19, 1975, and assigned to the assignee of the present application. The disclosures of the patent and of the said copending application are incorporated herein by reference to save unnecessary detail.

One problem commonly faced with many such compositions is their relatively low ability to bond to a wide variety of substrates, such as aluminum, stainless steel, brass, polycarbonate, polyacrylate, polyolefin, polyvinyl chloride, cardboard, glass, and the like. Especially significant substrates for bonding purposes with compositions of the RTV type are stainless steel and polyacrylate.

It has been proposed to use isocyanurates as adhesion promoters for such compositions. As an example, in the compositions of the RTV type described by Smith and Hamilton, the addition of tris-1,3-5-trimethoxysilyl-propylisocyanurate or bis-1,3-trimethoxylsilyl-propylisocyanurate, and analogs thereof has been found to promote adhesion to a variety of substrates. See Berger, U.S. Pat. Nos. 3,494,951; 3,498,852, and 3,821,218, each of which is incorporated herein by reference.

It has now been discovered, as part of an extensive program to improve adhesion in self-bonding silicone compositions of the RTV type, that a family of carbamates or derivatives thereof, known as allophanates, exists which has substantial superiority as adhesion promoters to compounds known to date. When compositions comprising predominantly such compounds are included in self-bonding silicone compositions of the RTV type described above, before curing, the final products adhere in a superior fashion to all common substrates, including the polyacrylates and stainless steels.

SUMMARY OF THE INVENTION

According to the present invention, there are provided self-bonding, low-modulus, one-package room temperature vulcanizing silicone compositions, having superior adhesion to substrates, comprising:
  i. a silanol chain-stopped diorganopolysiloxane,
  ii. a tri- or tetrafunctional, hydroxy-reactive silane or polysilane crosslinker therefor,
  iii. a catalyst capable of promoting the reaction between (i) and (ii), and
  iv. a small, effective, adhesion promoting amount of a composition comprising predominantly a compound of the formula:

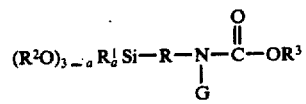

wherein G is hydrogen or a group of the formula:

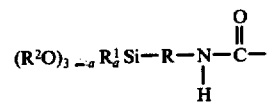

wherein R is a divalent radical selected from alkylenearylene, alkylene and cycloalkylene of up to 8 carbon atoms, $R^1$ and $R^3$, independently, are radicals of up to 8 carbon atoms selected from hydrocarbyl or halohydrocarbyl, $R^2$ is a radical of up to 8 carbon atoms selected from hydrocarbyl, halohydrocarbyl or cyanohydrocarbyl, and $a$ is 0 to 3, or a mixture of such compounds.

In another aspect, the present invention provides a method for producing such self-bonding silicone compositions, having superior adhesion to substrates, comprising adding to a composition defined by components (i), (ii) and (iii) above, a small, effective, adhesion promoting amount of a composition as defined by (iv) above.

The compositions for promoting adhesion comprise predominantly compounds which are carbamates, allophanates, or mixtures thereof, of the above formulae. These are to be distinguished from compositions previously employed to improve adhesion, such as those mentioned in the above-identified patents and applications, and especially the cyclic, substituted isocyanurates. The methods set out in the patents and applications to prepare the isocyanurates, e.g., reaction of silylorgano halides with an alkali metal cyanate, have been found to co-produce minor amounts of carbamates and/or allophanates, which correspond to the isocyanurates employed. In no event, however, did the compositions produced in the prior art and used as adhesion promoters comprise predominantly a carbamate and/or allophanate in the sense that more than about 20% by weight of the latter is present in the mixture used to promote adhesion. By methods which are described in the above-mentioned U.S. Pat. No. 3,494,951, and U.S. Pat. No. 3,821,218, compositions are obtained in which the carbamate and/or allophanate content is 50% or more, and these have now been discovered to possess the unexpectedly superior adhesion-promoting properties in comparison to previous compositions comprising predominantly the isocyanurates.

The reaction pathways used to obtain the compositions used to improve adhesion according to this invention are summarized as follows:

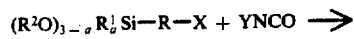

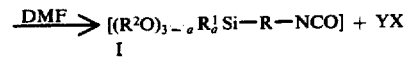

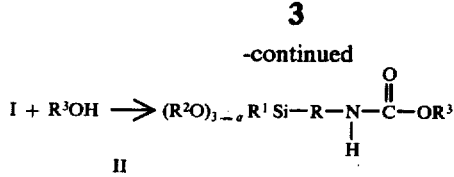

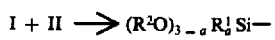

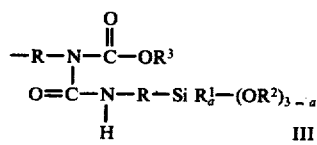

wherein R, $R^1$, $R^2$ and $R^3$ are as previously defined, X is halogen, especially chloro or bromo, and Y is a metal ion, e.g., an alkali metal ion, such as potassium or sodium.

The product I is an isocyanate, which is not isolated, and which ordinarily, in the absence of alcohol, $R^3OH$, trimerizes to the isocyanurates previously used as adhesion promoters. Compound II is known as a carbamate; compound III is a derivative of a carbamate, known as an allophanate. Obviously, other higher molecular weight carbamate derivatives can be formed by reaction of isocyanate I with nitrogen hydrogen bonds, such as that in III.

In the carbamates and the allophanates of the above-identified formulae, the substituents can vary widely. Illustrative groups defined by R can comprise, for example, phenyleneethylene, phenylenemethylene, and the like, or dimethylene, trimethylene, tetramethylene, and the like, or cyclopropylidene, cyclobutylidene, cyclopentylidene, cyclohexylidene, and the like. $R^1$ and $R^3$ are, illustratively, methyl, ethyl, propyl, butyl, 2-chloroethyl, 3-bromopropyl, phenyl, chlorophenyl, and the like, $R^2$ is illustratively methyl, ethyl, propyl, butyl, 2-chloroethyl, 3-bromopropyl, 3-cyanopropyl, phenyl, chlorophenyl, and the like. Especially preferred such compositions are those in which the predominating carbamates have the formula:

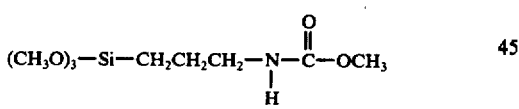

and those in which the allophanates have the formula:

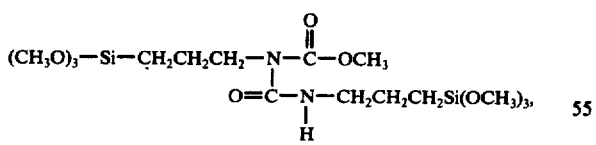

or those comprising predominantly mixtures of such compounds.

The compounds of this invention can be made by techniques known to those skilled in this art, following the pathways above. If, for example, the corresponding silylalkyl halide is reacted with an alkali metal cyanate in a dipolar aprotic solvent, e.g., dimethylformamide (DMF), under heating conditions, and in the presence of an equimolar amount of the corresponding alcohol, various yields of the corresponding carbamate and of the allophanates will be obtained. Of course, if the alcohol is omitted, then the formation of the corresponding isocyanurate of the prior art will be favored and such a product will predominate in the mixture. In general, however, with alcohol present initially, or even when added during the course of the reaction, the isocyanurate will never predominate. Moreover, with this condition, longer reaction times enhance allophante formation, with respect to the carbamate, as would be expected.

The carbamates can be separated from the allophanates and other higher molecular weight derivatives by conventional techaniques, e.g., by fractional distillation, but the crude mixture is entirely suitable as an adhesion promoter. In fact, the higher derivatives have been found to be unexpectedly superior in adhesion promoting efficiency. The methods used to prepare the adhesion promoting compositions of this invention will be outlined in detail hereinafter. In all cases, care should be taken to keep the amount of isocyanurate produced at a relatively low level, preferably below about 5% by weight, and in general, below about 20% by weight, and never in excess of 50% by weight.

The amount of composition to be employed will vary depending on the silicone used, but usually will be a small, effective amount, ranging from about 0.1 to about 15% by weight based on the silicone base polymer.

As to one of the preferred aspects, the room temperature vulcanizing compositions can readily be prepared following the teachings of the prior art. For example, the RTV compositions of the present invention are prepared by simply admixing the adhesion promoter with one or more of the silanes of the following formulae:

$CH_3Si(OCH_3)_3$
$CH_3Si(OCH_2CH_3)_3$
$(CH_3)_2Si(OCH_3)_2$
$(CH_3)_3SiOCH_3$

$Si(OCH_3)_4$
$CH_3CH_2CH_2CH_2CH_2CH_2CH_2Si(OCH_3)_3$
$CF_3CH_2Si(OCH_3)_3$
$NCCH_2CH_2Si(OCH_3)_3$
$(CH_3)Si(OCH_2CH_2CH_2CH_3)_3$ having an average of at least about 2.01 silicon-bonded alkoxy radicals per silicon atom and a catalyst comprising a metal ester, such as a titanium chelate and a silanol chain-stopped polydiorganosiloxane.

The silanol chain-stopped polydiorganopolysiloxanes useful in the RTV compositions of this invention can be represented by the formula:

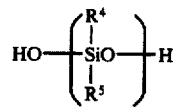

wherein $R^4$ and $R^5$ are each organic radicals of not more than 8 carbon atoms selected from the group consisting of hydrocarbyl, halohydrocarbyl and cyano lower alkyl, and $n$ is an average number from about 10 to about 15,000 or more.

The silanol chain-stopped polydiorganosiloxane are well known in the art and include compositions containing different $R^4$ and $R^5$ groups. For example, the $R^4$ groups can be methyl, while the $R^5$ groups can be phenyl and/or beta-cyanoethyl. Furthermore, within the scope of the definition of polydiorganosiloxanes useful in this invention are copolymers of various types of diorganosiloxane units, such as silanol chain-stopped copolymers of dimethylsiloxane units, diphenylsiloxane units and methylphenylsiloxane units, or, for example, copolymers of dimethylsiloxane units, methylphenylsiloxane units and methylvinylsiloxane units. Preferably, at least 50% of the $R^4$ and $R^5$ groups of the silanol chain-stopped polydiorganosiloxanes are methyl groups. The hydrocarbyl, halohydrocarbyl and cyano lower akyl radicals represented by $R^4$ and $R^5$ can be selected from the same group as those listed above for $R^3$.

The components are preferably at room temperature during mixing. Since the silanes tend to hydrolyze upon contact with moisture, care should be exercised to exclude moisture during the addition of the silane to the silanol chain-stopped polydiorganosiloxane. Likewise, care should be taken that the mixture of the silane, the catalyst and the silanol chainstopped polydiorganosiloxane is maintained under substantially anhydrous conditions if it is desired to store the admixture for an extended period of time prior to conversion of the composition to the cured, solid, elastic silicone rubber state. On the other hand, if it is desired to permit the mixture to cure immediately upon admixture of the silane, the catalyst and the polydiorganosiloxane, no special precautions are necessary and the components can be mixed and placed in the form or shape in which it is desired for the composition to be cured upon exposure to moisture.

The amount of the silane admixed with the silanol chain-stopped polydiorganosiloxane can vary within wide limits. However, for best results, it is preferred to add an excess of 1 mole of the silane per mole of silanol groups in the silanol chain-stopped polydiorganosiloxanes. Satisfactory curing can be obtained, for example, with from 1.0 to 10 moles of the silane per mole of silanol groups in the polydiorganosiloxane. No particular detriment is encountered when using more than 10 moles of the silane per mole of the polydiorganosiloxane except for a more resinous product being formed and slowing down the cure. The temperature at which the silane and the silanol chain-stopped polydiorganosiloxane are admixed is not critical and a room temperature addition is usually employed.

The preferred level of adhesion promoter composition in such composition is from 0.2 to 2 parts of adhesion promoter per 100 parts by weight of the silanol-stopped fluid component (i). Generally, however, 0.5 to 1.0 parts of adhesion promoter preferably will be used. Higher concentration of adhesion promoter sometimes tend to retard the curing of the RTV, so when a fast cure is desired, two parts of adhesion promoter 100 parts of component (i) should generally be regarded as maximum. Preferbly, the promoter is added with the catalyst and silane components.

A wide variety of catalysts can be used for the RTV compositions. Generally, these will be metal esters such as dibutyl tin diacetate, dibutyl tin dibenzoate, dibutyl tin adipate, lead octoate, tin ricinoleate, aluminum acetyl acetonate, dioctyl tin monoacetate, dialkyl tin acylates generally, as well as metal chelates. Preferred illustrations of titanium chelate catalysts for the RTV compositions of this invention include the following:

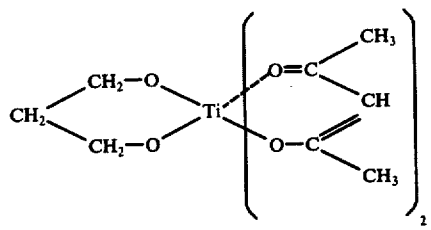

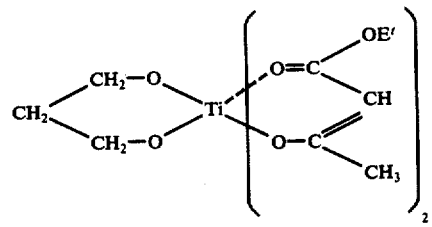

The amount of catalyst will vary, in general, between 0.01 and 10 parts by weight per 100 parts by weight of siloxane polymer. In especially preferred embodiments, the weight ratio of the catalyst to the cross-linking silane will always be at least 0.5 to 1.

Preferred compositions can also include fillers, such as silica, etc., preferably a silazane-treated silica filler. The fillers will be used in amounts from about 10 to about 100 parts of filler, per 100 parts of the silanol chain-stopped polydiorganosiloxane.

Room temperature vulcanizing compositions prepared by mixing the catalyst and the silane with the silanol chain-stopped polydiorganosiloxanes and adding the present adhesion promoters can be used without further modification in many sealing, caulking or coating applications by merely placing the compositions in the desired place and permitting them to cure upon exposure to the moisture present in the atmosphere. Upon exposure of such compositions to atmospheric moisture, even after shelf storage for times as long as one year or more, a "skin" will form on the composition shortly after such exposure. The time required for the formation of the skin can vary from a minimum of about 20 minutes to a maximum of about 2 hours, but they then will cure to the rubbery state within 4 to 12 hours, all at room temperature, about 23° C.

The room temperature vulcanizing compositions of the present invention are particularly adapted for caulking and sealing applictions where adhesion to various surfaces is important. For exaple, these materials are useful in household caulking applictions and industrial applications such as on buildings, in factories, in automotive equipment and in applications where excellent adhesion to masonry, glass, plastic, metal and wood is required.

DESCRIPTION OF THE PREFERRED EMBODIMENTS

The following procedures and examples illustrate the present invention. They are not to be construed to limit the claims in any manner whatsoever.

PROCEDURE A

An adhesion promoting composition is obtained by heating and reacting in a dry nitrogen atmosphere 300 gm. of gammachloropropyltrimethoxysilane and 122 gm. of anhydrous potassium cyanate powder in 300 gm. of dry N,N-dimthylformamide, and adding a total of 50 gm. of absolute methyl alcohol in increments at a rate sufficient to keep the reacting mixture temperature about 140° C. After addition of the methyl alcohol is complete, the reaction temperature levels at about 160° C. After 20 hours total reaction time, the mixture is cooled, filtered, stripped free of solvent at 150° C./20 mmHg and again filtered, to leave a light yellow liquid, which is analyzed and found to contain about 85% of a mixture of carbamate ester, methyl-N(trimethoxysilylpropyl) carbamate, and its corresponding allophanate, 5% of unreacted gamma-chloropropyltrimethoxysilane and 5% of the corresponding 1,3,5-(trimethoysilylpropyl) isocyanurate.

PROCEDURE B

An adhesion promoting composition is prepared by repeating the procedure of Procedure A, except that 50 gm. of absoloute methyl alcohol is present in the starting reaction mixture. An additional 50 gm. of alcohol is admitted in increments over a 24 hour period so that the reacting mixture temperature is always less than 110° C. The product mixture is worked up as before. Analysis shows it to comprise about 50% of the expected carbamate ester, about 50% of unreacted gamma-chloropropyltrimethoxysilane; and no isocyanurate is detected by gas chromatography.

PROCEDURE C

An adhesion promoting composition is prepared by heating and reacting in a dry nitrogen atmosphere 300 gm. of gamma-chloropropyltrimethoxysilane, 122 gm. of anhydrous potassium cyanate powder, and 50 gm. of absolute methyl alcohol in 300 gm. of dry N,N-dimethylformamide under reflux conditions. The reacting mixture temperature increases from 110° to 155° C. after 19 hours. The product is worked up as before and analyzed and found to comprise about 90% of carbamate ester mixed with the corresponding allophanate, and 5% of the corresponding isocyanurate.

PROCEDURE D

An adhesion promoting composition is prepared by repeating the procedure of Procedure A, except a shorter reaction time of 5 hours at reflux temperatures is employed. A final reacting mixture temperature of 160° C. is obtained. The product is worked up as before and analyzed and found to comprise about 97% of carbamate ester and the corresponding allophanate, and less than 1% of the corresponding isocyanurate.

PROCEDURE E

An adhesion promoting composition is prepared by fractionally distilling the product of Procedure D. Two hundred eighty three grams is distilled under a vacuum of 1 to 2 mmHg until take off appears negligible at 160° C. There is obtained 44 grams of residue, with adhesion promoting properties, and 236 grams of distillate, which has relatively poor adhesion capability, when polyacrylate or stainless steel is the substrate.

Analysis of the residue by gel permeation chromatography discloses four component fractions. The presence of less than 10% each of the carbamate ester and isocyanurate is indicated, the bulk being an intermediate molecular weight material, the allophanate. An infrared spectrum of each of the components isolated from the chromatograph is in agreement with the proposed structures. The intensity of NH absorption in the infrared at about 6.5 microns, characteristic of carbamates and their derivatives, decreases with increasing component retention in the instrument, there being no such band for the isocyanurate, as expected. Infrared spectra of the fractions taken overhead during the distillation show only a trace of isocyanate (absorption at 4.4 microns) present in the last 12 grams distilled over. No isocyanate absorption is observed in the other distillate fractions or the residue.

EXAMPLES 1 – 5

A low-modulus, room temperature vulcanizing composition, curable on exposure to moisture is prepared comprising the following (by weight):

| | |
|---|---|
| 25,000 cps. viscosity silanol terminated polydimethylsiloxane | 100 parts |
| stearic acid treated calcium carbonate (filler) | 85 " |
| octamethyltetrasiloxane-treated fumed silica filler having a surface area of approximately 20 m$^2$/g. | 10 " |
| a silanol-containing 25 cs. viscosity polymethylsiloxane fluid having approximately 5 mole % trimethylsiloxy, 20 mole % methylsiloxy, 75 mole % dimethylsiloxy groups and 0.5 weight % silanol | 15 " |

A catalyst solution is prepared comprising the following (by weight):

| | |
|---|---|
| methyltrimethoxysilane | 0.5 parts |
| 1,3-dioxypropanetitanium-bis-ethylacetoacetate (catalyst) | 1.8 " |

One hundred parts of the base compound is mixed together with 2.3 parts of the catalyst solution in the absence of air and moisture. The anhydrous material is allowed to stand for three days to come to chemical equilibrium. Samples are cured by exposure to 50 ± 5% relative humidity and 77° ± 2° F. for 168 hours.

Typical properties of the rubber are:

| | |
|---|---|
| Shore A hardness | 25 |
| Tensile strength, psi | 155 |
| Elongation, % | 860 |
| Application rate g./min. | 115 |
| Rheological properties | non-sagging |

The formulation is compounded with the adhesion promoters of the above procedures, cured as described above, and tested for adhesion against polyacrylate and stainless steel substrates. The adhesion promoters each are added in the amount of 0.75 parts by weight (per 100 parts by weight of silanol-terminated polydimethylsiloxane) in the catalyst solution component.

The adhesion results are set forth in the Table.

Table

Adhesion Test Results

| Example | Adhesion Promoter | Parts by Weight | Bond-% Cohesive Failure | |
|---|---|---|---|---|
| | | | Polyacrylate | Stainless Steel |
| control | none | 0.00 | 0 | 0 |
| 1 | carbamate ester, slow MeOH addition (Procedure A) | 0.75 | 85 | 100 |
| 2 | carbamate ester, MeOH initially (Procedure B) | 0.75 | 20 | 100 |
| 3 | carbamate ester, slow MeOH addition long reaction (Procedure C) | 0.75 | 85 | 100 |
| 4 | carbamate ester, MeOH initially, short reaction (Procedure D) | 0.75 | 38 | 35 |
| 5 | carbamate ester residue of Procedure D (Procedure E) | 0.75 | 100 | 100 |

It should be noted that there is no cohesive failure with no adhesion promoter, and that bonding of the other formulations to these difficult substrates is markedly improved by use of the compositions of this invention. Especially outstanding results are obtained with the residue of Procedure E, which indicates the desirability of providing formulations with at least some and preferably as much as possible of the carbamate higher condensation products. It should be noted that a center distillation cut from the overhead in Procedure E weighs 135 g. and boils at a head temperature of 125° C./1-2 mm Hg. Gel permeation chromatography and infrared analysis indicates this to be essentially pure methyl-N-(trimethoxysilylpropyl) carbamate. When used as an adhesion promoter, this provides cohesive failure values of 20% on each of polyacrylate and stainless steel.

Obviously, many variations are possible in light of the above, detailed disclosure. For example, substitution of the following silylorgano halides for 3-trimethoxysilylpropyl chloride and the alcohols for methanol will lead to the corresponding alkyl carbamates and allophanates, having adhesion promoting properties:

3-dimethoxymethylsilylpropyl chloride
2-trimethoxysilylethyl chloride
trimethoxysilyl (4phenylethylidene) chloride
3-triphenoxysilylpropyl chloride
3-(2-chloroethoxy)silylpropyl chloride
3-(3-cyanopropoxy)silylpropyl chloride
ethanol, n-propanol, and 2-ethylhexanol In addition, the silicone formulation of Example 1 can be modified by substituting 1,3-dioxypropanetitaniumbisacetylacetonate, as the catalyst, by using a 190,000 cps. viscosity silanol-terminated polydimethylsiloxane, by using an iron, germanium or zirconium analog of the titanium ester catalyst, etc.

It is, therefore, to be understood that changes may be made in the particular embodiments of this invention which are within the full intended scope of the invention as defined by the appended claims.

We claim:

1. A self-bonding, low modulus, one-package room temperature vulcanizing silicone composition, having superior adhesion to substrates, comprising:
   i. a silanol chain-stopped diorganopolysiloxane,
   ii. a tri- or tetrafunctional, hydroxy-reactive silane or polysilane crosslinker therefor,
   iii. a catalyst capable of promoting the reactions between (i) and (ii), and
   iv. a small, effective, adhesion promoting amount of a composition comprising predominantly a compound of the formula:

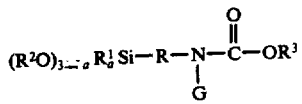

wherein G is hydrogen or a group of the formula:

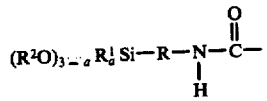

wherein R is a divalent radical selected from alkylenearylene, alkylene and cycloalkylene of up to 8 carbon atoms, $R^1$ and $R^3$, independently, are radicals of up to 8 carbon atoms selected from hydrocarbyl or halohydrocarbyl, $R^2$ is a radical of up to 8 carbon atoms selected from hydrocarbyl, halohydrocarbyl or cyanohydrocarbyl, and $a$ is 0 to 3, or a mixture of such compounds.

2. A composition as defined in claim 1 wherein said catalyst (iii) is a silanol reactive organometallic ester compound of a metal and the weight ratio of components (iii) to (ii) is always at least 0.5 to 1.

3. A composition as defined in claim 1 wherein said adhesion promoter (iv) is predominantly of the formula:

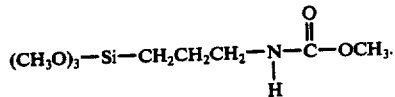

4. A composition as defined in claim 1 wherein said adhesion promoter is predominantly of the formula:

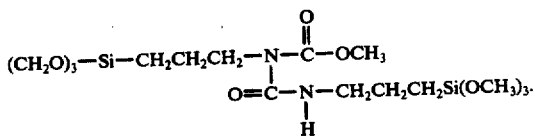

5. A composition as defined in claim 1 wherein said adhesion promoter is predominantly a mixture of compound of the formulae:

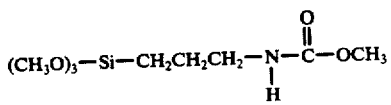

and

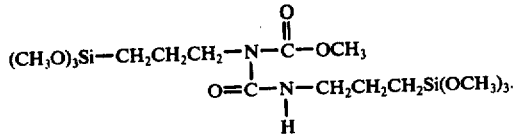

6. A process for producing a self-bonding, one-package room temperature vulcanizing silicone composition, having superior adhesion to substrates, said process comprising adding to a composition comprising:
 i. a silanol chain-stopped diorganosiloxane,
 ii. a tri- or tetrafunctional, hydroxy-reactive silane or polysilane crosslinker therefor, and
 iii. a catalyst capable of promoting the reactions between (i) and (ii), a small, effective, adhesion promoting amount of a composition comprising predominantly a compound of the formula:

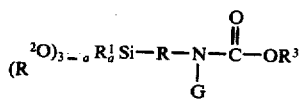

wherein G is hydrogen or a group of the formula:

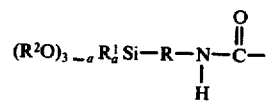

wherein R is a divalent radical selected from alkylenearylene, alkylene and cycloalkylene of up to 8 carbon atoms, R¹ and R³, independently, are radicals of up to 8 carbon atoms selected from hydrocarbyl or halohydrocarbyl, R² is a radical of up to 8 carbon atoms selected from hydrocarbyl, halohydrocarbyl or cyanohydrocarbyl, and a is 0 to 3, or a mixture of such compounds.

7. In a self-bonding, low modulus, one-package room temperature vulcanizing silicone composition having superior adhesion to substrates comprising (i) a silanol chain-stopped diorganopolysiloxane, (ii) a tri- or tetrafunctional, hydroxy reactive silane or polysilane crosslinker therefor, (iii) a catalyst capable of promoting the reactions between (i) and (ii), and (iv) a nitrogen functional silane adhesion promoter, the improvement which comprises using as said nitrogen functional silane adhesion promoter a small, effective, adhesion promoting amount of a composition predominantly a compound of the formula:

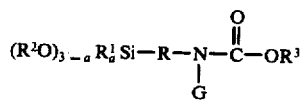

wherein G is hydrogen or a group of the formula:

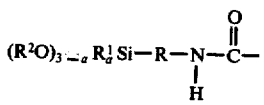

wherein R is a divalent radical selected from alkylenearylene, alkylene and cycloalkylene of up to 8 carbon atoms, R¹ and R³, independently, are radicals of up to 8 carbon atoms selected from hydrocarbyl or halohydrocarbyl, R² is a radical of up to 8 carbon atoms selected from hydrocarbyl, halohydrocarbyl or cyanohydrocarbyl, and a is 0 to 3, or a mixture of such compounds.

8. A composition as defined in claim 7 wherein said catalyst (iii) is a silanol reactive organometallic ester compound of a metal and the weight ratio of components (iii) to (ii) is always at least 0.5 to 1.

9. A composition as defined in claim 7 wherein said adhesion promoter (iv) is predominantly of the formula:

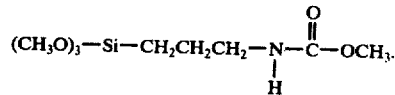

10. A composition as defined in claim 7 wherein said adhesion promoter is predominantly of the formula:

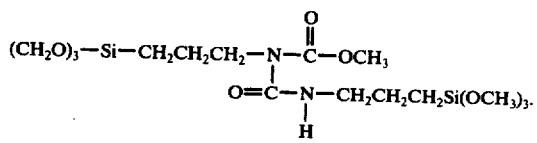

11. A composition as defined in claim 7 wherein said adhesion promoter is predominantly a mixture of compounds of the formulae:

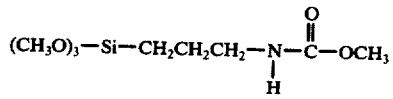

and

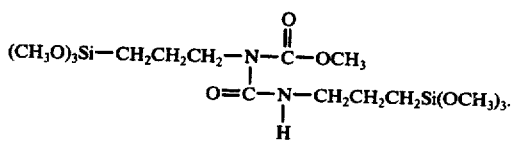

12. In a process for producing a self-bonding one-package room temperature vulcanizing silicone composition having superior adhesion to substrates comprising adding to a composition comprising:
 i. a silanol chain-stopped diorganosiloxane,
 ii. a tri- or tetrafunctional, hydroxy-reactive silane or polysilane crosslinker therefor,
 iii. a catalyst capable of promoting the reactions between (i) and (ii), and
 iv. a nitrogen functional silane adhesion promoter; the improvement which comprises using as said nitrogen functional silane adhesion promoter a small, effective, adhesion promoting amount of a composition comprising predominantly a compound of the formula:

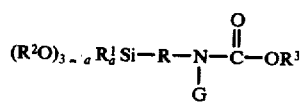

wherein G is hydrogen or a group of the formula:

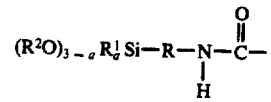

wherein R is a divalent radical selected from alkylenearylene, alkylene and cycloalkylene of up to 8 carbon atoms, $R^1$ and $R^3$, independently, are radicals of up to 8 carbon atoms selected from hydrocarbyl or halohydrocarbyl, $R^2$ is a radical of up to 8 carbon atoms selected from hydrocarbyl, halohydrocarbyl or cyanohydrocarbyl, and $a$ is 0 to 3, or a mixture of such compounds.

* * * * *